United States Patent

Yashiki et al.

(10) Patent No.: US 9,255,494 B2
(45) Date of Patent: Feb. 9, 2016

(54) STEAM TURBINE POWER PLANT

(71) Applicant: Hitachi, Ltd., Chiyoda-ku, Tokyo (JP)

(72) Inventors: Tatsuro Yashiki, Tokyo (JP); Yasuhiro Yoshida, Tokyo (JP); Takuya Yoshida, Tokyo (JP); Naohiro Kusumi, Tokyo (JP); Kazunori Yamanaka, Tokyo (JP); Kenichiro Nomura, Tokyo (JP); Masaaki Tomizawa, Tokyo (JP); Fumiyuki Suzuki, Tokyo (JP); Yuichi Takahashi, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 268 days.

(21) Appl. No.: 14/077,828

(22) Filed: Nov. 12, 2013

(65) Prior Publication Data

US 2014/0290249 A1    Oct. 2, 2014

(30) Foreign Application Priority Data

Mar. 29, 2013   (JP) .................................. 2013-073155

(51) Int. Cl.

| F01K 13/02 | (2006.01) |
|---|---|
| F01D 19/02 | (2006.01) |
| F01K 23/10 | (2006.01) |
| F01K 7/16 | (2006.01) |

(52) U.S. Cl.
CPC ................ F01D 19/02 (2013.01); F01K 7/165 (2013.01); F01K 13/02 (2013.01); F01K 23/101 (2013.01)

(58) Field of Classification Search
CPC ....... F01D 19/02; F01K 7/165; F01K 23/101; F01K 13/02
USPC .................................... 60/646, 657, 660, 665
See application file for complete search history.

(56) References Cited

U.S. PATENT DOCUMENTS

| 3,097,490 | A | * | 7/1963 | Callan et al. ..................... 60/660 |
| 4,287,430 | A | * | 9/1981 | Guido .......................... 290/40 C |
| 4,651,533 | A | * | 3/1987 | Ura et al. ........................ 60/678 |
| 4,888,953 | A | * | 12/1989 | Fukayama et al. .............. 60/657 |
| 5,042,246 | A | | 8/1991 | Moore et al. |
| 5,347,466 | A | * | 9/1994 | Nichols et al. .................. 703/18 |
| 8,240,148 | B2 | | 8/2012 | Matsumoto et al. |
| 2006/0233637 | A1 | | 10/2006 | Yakushi et al. |
| 2010/0281877 | A1 | | 11/2010 | Asanaka et al. |
| 2012/0240589 | A1 | | 9/2012 | Tateishi et al. |

FOREIGN PATENT DOCUMENTS

| GB | 2 152 591 A | 8/1985 |
| JP | 2009-281248 A | 12/2009 |
| SU | 1206446 A | 1/1986 |

OTHER PUBLICATIONS

European Search Report dated Feb. 20, 2015 (Six (6) pages).

* cited by examiner

*Primary Examiner* — Hoang Nguyen

(74) *Attorney, Agent, or Firm* — Crowell & Moring LLP

(57) ABSTRACT

Disclosed is a steam turbine power plant adapted to start operating safely even if prediction accuracy of its startup constraints cannot be obtained. The system calculates predictive values and current values of startup constraints of a steam turbine from process variables of plant physical quantities, next calculates in parallel both a first control input variable for a heat medium flow controller based on predictive values, and a second control input variable for a main steam control valve based on the current values, and while preferentially selecting the first control input variable, if the first control input variable is not calculated, selects the second control input variable instead. After the selection of at least one of the first and second control input variables, the system outputs an appropriate command value to the heat medium flow controller and the main steam control valve according to the kind of selected control input variable.

6 Claims, 7 Drawing Sheets

STEAM TURBINE POWER PLANT

BACKGROUND OF THE INVENTION

1. Field of the Invention

The present invention relates to a steam turbine power plant.

2. Description of the Related Art

It is being demanded that a starting time of a steam turbine power-generating plant be further reduced for suppressed instability of the electric power in a grid-connected power system by connecting renewable energy, represented by wind power generation or solar power generation, to the power system. When the steam turbine is started up, however, steam abruptly increases in both temperature and flow rate. A consequential sudden increase in a surface temperature of the turbine rotor relative to an internal temperature thereof augments a radial temperature gradient and thus increases a thermal stress. An excessive thermal stress could shorten a life of the turbine rotor. In addition, if the change in the temperature of the steam is significant, differential thermal expansion due to a difference in heat capacity occurs between the turbine rotor and casing of the turbine. If the differential thermal expansion increases, this could lead to contact between the rotating turbine rotor and the stationary casing, and hence to damage to both thereof. When the steam turbine is started, therefore, there is a need to control the thermal stress of the turbine rotor and the differential thermal expansion thereof with respect to that of the casing so as to fall within a range of respective limit values.

In a known technique allowing for the above, before a steam turbine is started, the thermal stresses and differential thermal expansion that are estimated to occur during a definite period of time ahead from current time of day are calculated by prediction and then the start of the turbine is controlled so that the predictively calculated thermal stresses and differential thermal expansion fall within a range of respective limit values (refer to JP-2009-281248-A, shown as Patent Document 1 below).

SUMMARY OF THE INVENTION

According to Patent Document 1, the thermal stresses and the like are predictively calculated using input signals on process variables of the plant physical quantities, such as a temperature and pressure of steam at the turbine inlet, and control input variables of the plant are determined from the predictively calculated values. For reasons such as a malfunction of a measuring instrument, however, the process variables of the plant physical quantities may not be input or the predictive calculation may not keep up with changes in thermal stress or other startup constraints. In these cases, prediction accuracy of the startup constraints is not likely to be maintainable and this could result in failure to start the plant safely with the startup constraints kept within the range of the limit values.

The present invention has been made with the above in mind, and an object of the invention is to provide a steam turbine power plant adapted to start operating safely even if prediction accuracy of its startup constraints cannot be obtained.

In order to attain the above object, the present invention calculates predictive values and current values of steam turbine startup constraints based on process variables of the plant physical quantities, and calculates in parallel both a first control input variable based on the predictive values, and a second control input variable based on the current values. Then, while preferentially selecting the first control input variable, if the first control input variable is not calculated, this invention selects the second control input variable instead to control physical quantities of a plant.

In accordance with the present invention, a steam turbine power plant is started safely, even if prediction accuracy of its startup constraints cannot be obtained.

DESCRIPTION OF PREFERRED EMBODIMENTS

Hereunder, embodiments of the present invention will be described using the accompanying drawings.

First Embodiment

1. Steam Turbine Power Plant

Figure 1:
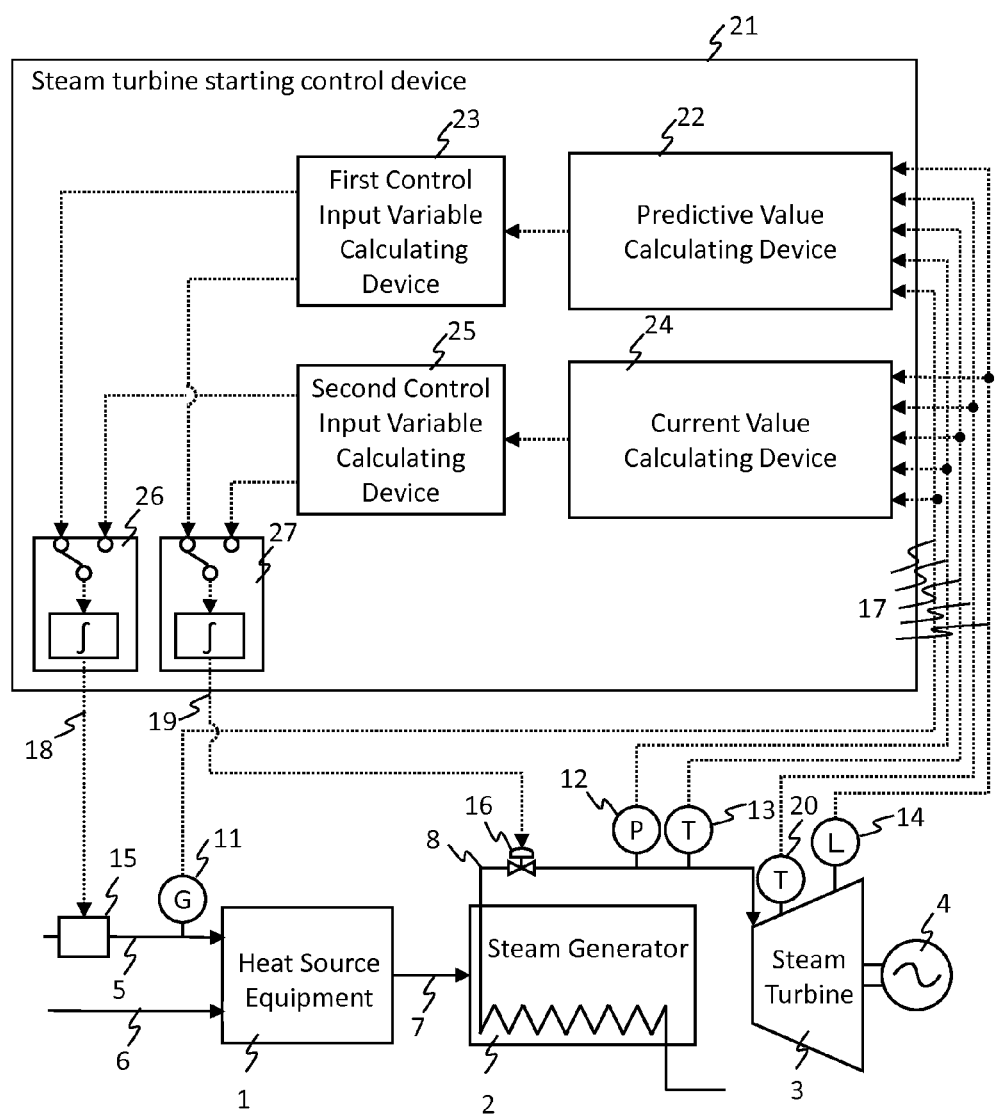
FIG. 1 is a schematic configuration diagram of a steam turbine power plant according to a first embodiment of the present invention.

FIG. 1 is a schematic configuration diagram of a steam turbine power plant according to a first embodiment of the present invention.

The steam turbine power plant shown in FIG. 1 includes heat source equipment 1, a steam generator 2, a steam turbine 3, an electric generator 4, a heat medium flow controller 15, a main steam control valve 16, and a steam turbine starting control device 21. An example in which the heat source equipment 1 in the present embodiment is a gas turbine, that is, the steam turbine power plant is of a combined-cycle type, is described below.

The heat source equipment 1 uses the amount of heat possessed by a heat medium 5 (in the present example, a gas fuel, a liquid fuel, a hydrogen-containing fuel, or the like), to heat a low-temperature flow 6 (in the example, a flow of air burned with the fuel) and supply this heated flow as a high-temperature flow 7 (in the example, a combustion gas that has been used to drive the gas turbine) to the steam generator 2. The steam generator 2 (in the present example, a waste heat recovery boiler) heats feed water by heat exchange with the heat held by the high-temperature flow 7 which has been generated by the heat source equipment 1, and thereby generates steam 8. The steam 8 thus generated by the steam generator 2 is next used to drive the steam turbine 3. The electric generator 4 is coaxially coupled to the steam turbine 3, and the generator 4 converts rotational driving force of the steam turbine 3 into electric power. The electric power that the generator 4 has generated is output to, for example, an electric power system (not shown). A temperature gauge 20 and a differential thermal expansion gauge 14 are also provided on the steam turbine 3. The temperature gauge 20 measures a temperature of a metal such as a first-stage casing of the steam turbine 3, and the differential thermal expansion gauge 14 measures a difference in axial thermal expansion level between a rotor of the steam turbine 3 and the turbine casing.

The heat medium flow controller 15 (in the present example, a fuel control valve) is provided on a heat medium supply path leading to the heat source equipment 1, and the heat medium flow controller 15 controls a flow rate of the heat medium supplied to the heat source equipment 1. The controller 15 functions as a controller to control a load upon the steam turbine power plant. On the heat medium supply path, a flowmeter 11 is also provided at a downstream side of the heat medium flow controller 15, which measures the flow rate of the heat medium 5 supplied to the heat source equipment 1.

The main steam control valve 16 is provided on a main steam line connecting the steam generator 2 and the steam turbine 3. The main steam control valve 16, which controls a flow rate of the steam supplied to the steam turbine 3, can function as a controller to control the load of the steam turbine power plant. In addition, on the main steam line, a pressure gauge 12 and a temperature gauge 13 are provided at downstream positions of the main steam control valve 16 that are closer to the steam turbine 3. The pressure gauge 12 and the temperature gauge 13 measure a pressure and temperature, respectively, of a main steam flow streaming through the main steam line.

Various process variables that indicate the physical quantities of the plant are input to the steam turbine starting control device 21 via process variables data lines 17. Examples of these physical quantities are the flow rate of the heat medium 5 measured by the flowmeter 11, the pressure and temperature of the steam 8 measured by the pressure gauge 12 and the temperature gauge 13, respectively, the first-stage metal temperature of the steam turbine 3 measured by the temperature gauge 20, and the differential thermal expansion measured by the differential thermal expansion gauge 14. Other physical quantities may be additionally input to the steam turbine starting control device 21. In an example, a path for supplying the low-temperature flow 6 to the heat source equipment 1 may include a flowmeter, which will measure a flow rate of the low-temperature flow 6 supplied to the heat source equipment 1 and input a result of the measurement to the steam turbine starting control device 21. In this case, the path for supplying the low-temperature flow 6 to the heat source equipment 1 will further include a low-temperature flow controller (e.g., an inlet guide vane: IGV) to control the flow rate of the low-temperature flow 6 supplied to the heat source equipment 1.

2. Steam Turbine Starting Control Device

The steam turbine starting control device 21 outputs a heat medium flow control command value 18 to the heat medium flow controller 15, and a main steam control command value 19 to the main steam control valve 16, both based on the process variables data 17. The steam turbine starting control device 21 includes as its elements, a predictive value calculating device 22, a first control input variable calculating device 23, a current value calculating device 24, a second control input variable calculating device 25, and command output devices 26 and 27. These elements are each described in order below.

Predictive Value Calculating Device

The predictive value calculating device 22 calculates, from the received process variables data 17, predictive values of any startup constraints estimated to occur during a fixed period of time from current time of day to the future. The startup constraints refer to those changes in physical quantities due to abrupt increases in steam temperature, steam pressure, or the like, that will appear when the steam turbine 3 is started. The physical quantities here are a magnitude of a thermal stress applied to the steam turbine rotor, that of axial differential thermal expansion in the turbine rotor and the casing accommodating the turbine rotor, and other variables developing during the startup of the turbine. Hereinafter, when the wording "thermal stress" is used, this simply means the thermal stress upon the turbine rotor, and when the wording "differential thermal expansion" is used, this simply means the axial differential thermal expansion of the turbine rotor and the casing. Further details of the predictive value calculating device 22 will be described later herein using FIGS. 2 and 3.

First Control Input Variable Calculating Device

The first control input variable calculating device 23 calculates, from the predictive values that the predictive value calculating device 22 has calculated, a first control input variable for the heat medium flow controller 15 and the main steam control valve 16. The first control input variable is such that the startup constraints occurring in the startup process for the steam turbine power plant will not exceed a previously set limit value. The first control input variable calculated here is a control input variable based on the predictive values of the startup constraints and relating to the heat medium flow controller 15 and the main steam control valve 16. More specifically, the first control input variable is a command value specifying a rate of change for the control input variable of the heat medium flow controller 15 and the main steam control valve 16. Further details of the first control input variable calculating device 23 will be described later herein using FIG. 3.

Current Value Calculating Device

The current value calculating device 24 calculates a value of the startup constraints of the current time of day, by estimation based on the received process variables data 17. Further details of the current value calculating device 24 will be described later herein using FIGS. 4 and 5.

Second Control Input Variable Calculating Device

The second control input variable calculating device 25 calculates a second control input variable for the heat medium flow controller 15 and the main steam control valve 16. The second control input variable is such that the current value that the current value calculating device 24 has calculated does not exceed a previously set limit value in the startup process for the steam turbine power plant. The second control input variable calculated here is a control input variable based on the current value of the startup constraints and relating to the heat medium flow controller 15 and the main steam control valve 16. More specifically, the second control input variable is a command value specifying a rate of change for the control input variable of the heat medium flow controller 15 and the main steam control valve 16. Further details of the second control input variable calculating device 25 will be described later herein using FIG. 5.

Command Output Devices

While preferentially selecting the first control input variable, if the first control input variable is not calculated, each of the command output devices selects the second control input variable instead. After the selection of either the first or second control input variable, the command output device outputs a relevant command value to the heat medium flow controller 15 and the main steam control valve 16. For example, if the first and second control input variables are both already calculated and both are input, the command output device selects the first control input variable on an either-or selection basis and determines the selected variable as a final control input variable. The element that selects the control input variable for the heat medium flow controller 15 and calculates and outputs a command value is the command output device 26, and the command value that the command output device 26 has obtained by conducting an integral calculation of the control input variable is the heat medium flow control command value 18. Similarly, the element that selects the control input variable for the main steam control valve 16 and calculates and outputs a command value is the command output device 27, and the command value that the command output device 27 has obtained by conducting an integral calculation of the control input variable is the main steam control command value 19. As a result, the heat medium flow controller 15 and the main steam control valve 16 execute, for example, PID control to control the control input variable (in the present example, a valve opening angle) according to the heat medium flow control command value 18 and the main steam control command value 19, respectively.

3. Predictive Value Calculating Device

Figure 2:
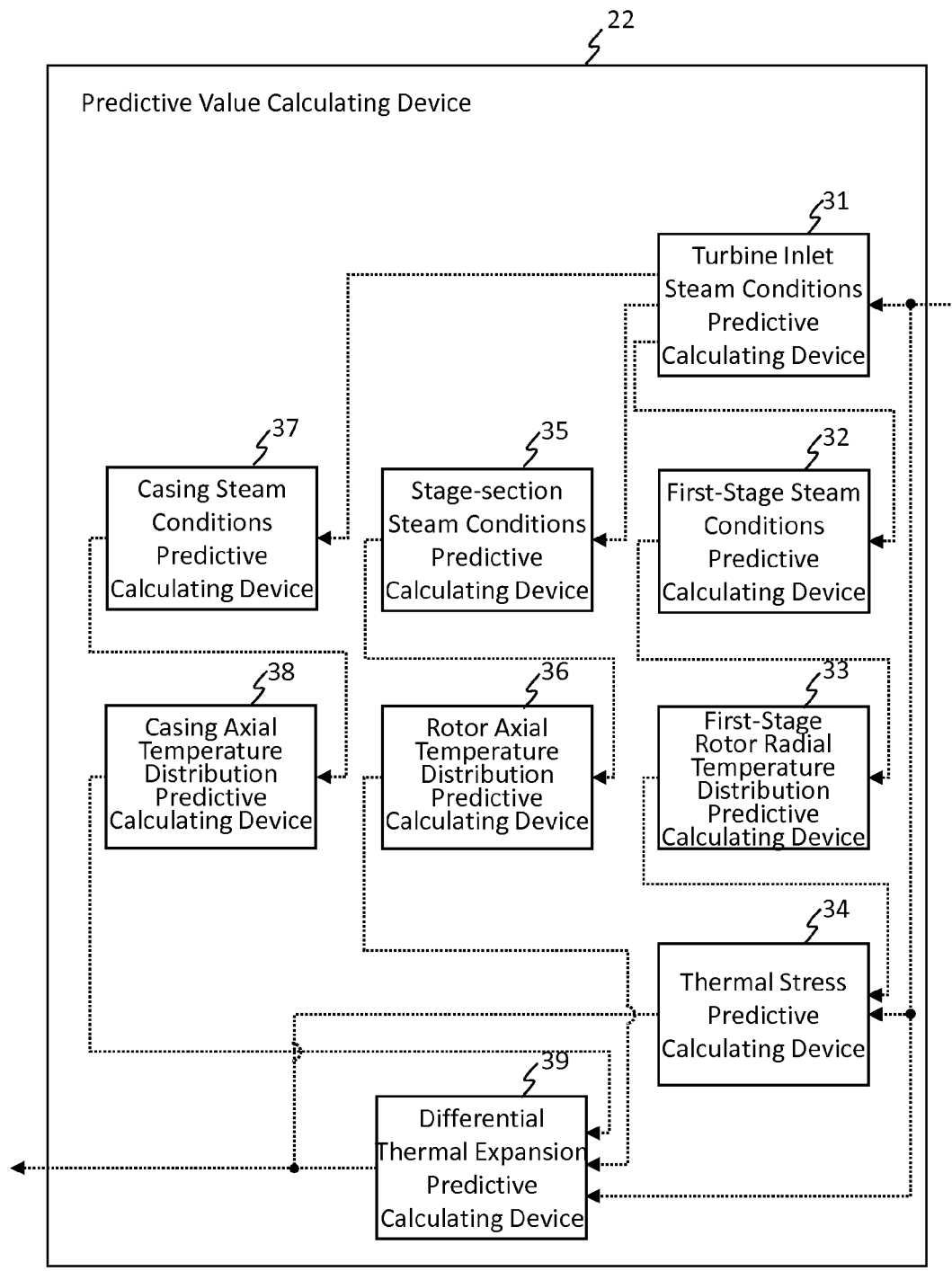
FIG. 2 is a block diagram of a predictive value calculating device fitted in the steam turbine power plant according to the first embodiment of the present invention.

FIG. 2 is a block diagram that shows details of the predictive value calculating device 22.

As shown in FIG. 2, the predictive value calculating device 22 includes as its elements, a turbine inlet steam conditions predictive calculating device 31, a first-stage steam conditions predictive calculating device 32, a first-stage rotor radial temperature distribution predictive calculating device 33, a thermal stress predictive calculating device 34, a stage-section steam conditions predictive calculating device 35, a rotor axial temperature distribution predictive calculating device 36, a casing steam conditions predictive calculating device 37, a casing axial temperature distribution predictive calculating device 38, and a differential thermal expansion predictive calculating device 39. These elements are each described in order below.

Turbine Inlet Steam Conditions Predictive Calculating Device

The turbine inlet steam conditions predictive calculating device 31 first calculates, from the flow rate of the heat medium 5 that has been measured by the flowmeter 11, a process in which heat and matter propagate from the heat source equipment 1 through the steam generator 2 to the steam turbine 3. Next, the turbine inlet steam conditions predictive calculating device 31 calculates, from a result of the above calculation, conditions relating to the steam at the inlet of the steam turbine 3, more specifically, a flow rate, pressure, and temperature of the steam.

First-Stage Steam Conditions Predictive Calculating Device

The first-stage steam conditions predictive calculating device 32 predictively calculates conditions relating to the steam in a first stage section of the steam turbine 3 (i.e., the first-stage steam), from calculation results by the turbine inlet steam conditions predictive calculating device 31. More specifically, the calculating device 32 calculates a flow rate, pressure, temperature, and heat transfer coefficient of the steam. These conditions are calculated allowing for a pressure drop in the first stage section of the steam turbine 3.

First-Stage Rotor Radial Temperature Distribution Predictive Calculating Device

The first-stage rotor radial temperature distribution predictive calculating device 33 calculates a radial distribution of the turbine rotor temperature by calculating the heat transfer from the steam in the first stage section to the turbine rotor predictively from calculation results by the first-stage steam conditions predictive calculating device 32.

Thermal Stress Predictive Calculating Device

The thermal stress predictive calculating device 34 predictively calculates, from calculation results by the first-stage rotor radial temperature distribution predictive calculating device 33, a thermal stress of the turbine rotor that is based on materials mechanics calculation that uses a coefficient of linear thermal expansion, Young's modulus, Poisson's ratio, and other parameters of the rotor. The calculating device 34 additionally corrects the calculated value of the thermal stress on the basis of the process variables data 17.

Stage-Section Steam Conditions Predictive Calculating Device

The stage-section steam conditions predictive calculating device 35 predictively calculates conditions relating to the steam in various stage sections of the steam turbine 3, from calculation results by the turbine inlet steam conditions predictive calculating device 31. More specifically, the calculating device 35 calculates flow rates, pressures, temperatures, and heat transfer coefficients of the steam in each stage section. These conditions are calculated allowing for pressure drops in the stage sections of the steam turbine 3.

Rotor Axial Temperature Distribution Predictive Calculating Device

The rotor axial temperature distribution predictive calculating device 36 calculates an axial distribution of the turbine rotor temperature by calculating the heat transfer from the steam in each stage section to the turbine rotor predictively from calculation results by the stage-section steam conditions predictive calculating device 35.

Casing Steam Conditions Predictive Calculating Device

The casing steam conditions predictive calculating device 37 predictively calculates conditions relating to the steam in the turbine casing, from calculation results by the turbine inlet steam conditions predictive calculating device 31. More specifically, the calculating device 37 calculates a flow rate, pressure, temperature, and heat transfer coefficient of the steam in the casing. These conditions are calculated allowing for a pressure drop in the casing.

Casing Axial Temperature Distribution Predictive Calculating Device

The casing axial temperature distribution predictive calculating device 38 calculates an axial distribution of the casing temperature by calculating the heat transfer from the casing steam to the casing predictively from calculation results by the casing steam conditions predictive calculating device 37.

Differential Thermal Expansion Predictive Calculating Device

First, the differential thermal expansion predictive calculating device 39 predictively calculates thermal expansion levels of the turbine rotor and casing by materials mechanics calculation with respective coefficients of linear thermal expansion, from calculation results by the rotor axial temperature distribution predictive calculating device 36 and the casing axial temperature distribution predictive calculating device 38. Next, the differential thermal expansion predictive calculating device 39 predictively calculates differential thermal expansion from a difference between the above-calculated thermal expansion levels. Further, the calculating device 39 corrects the predicted value of the differential thermal expansion on the basis of the process variables data 17.

4. Calculation Sequence Relating to the First Control Input Variable

Figure 3:
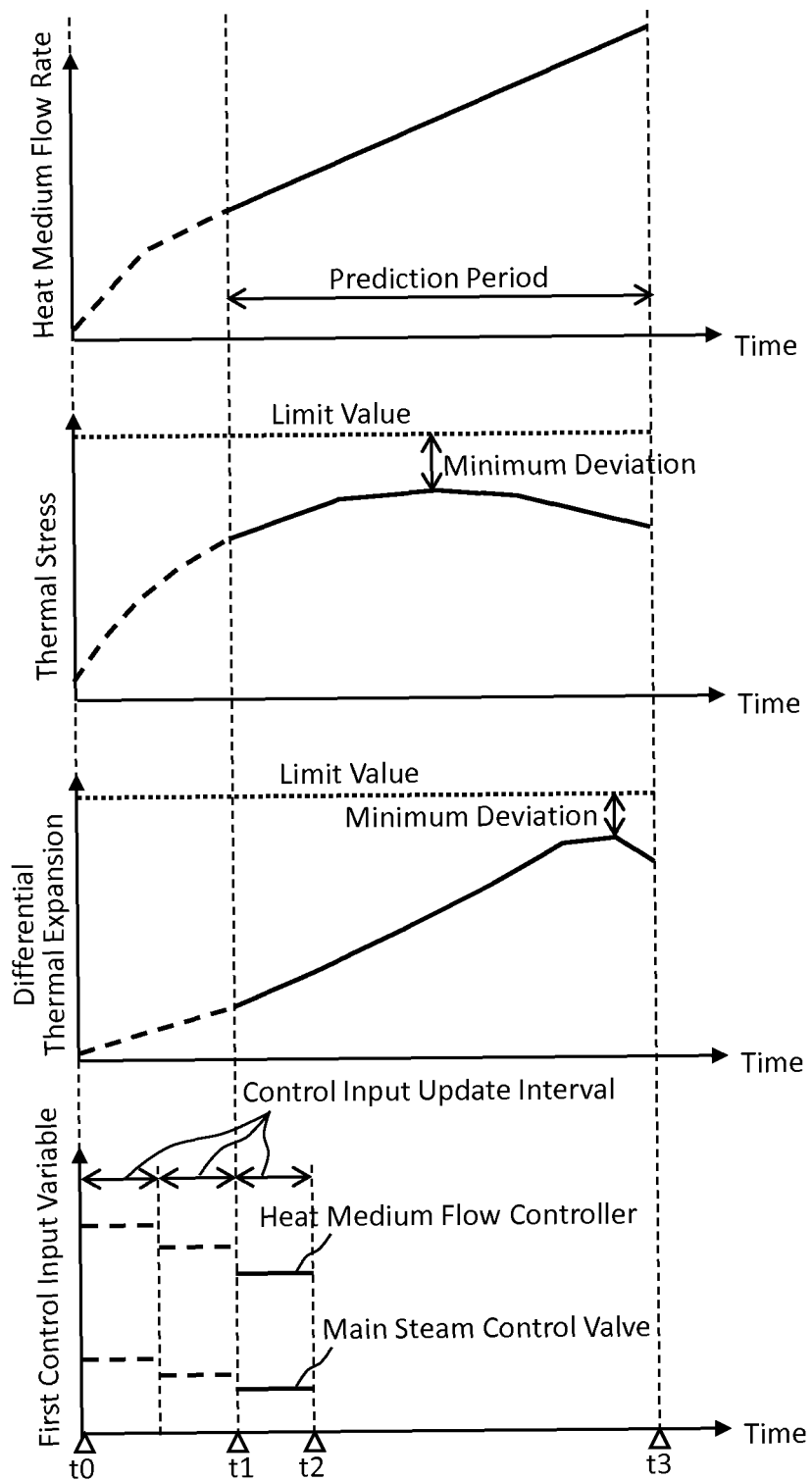
FIG. 3 is an explanatory diagram showing a calculation sequence relating to a first control input variable.

FIG. 3 is an explanatory diagram showing a calculation sequence relating to the first control input variable.

In a case that the flow rate of the heat medium during a time period up to the current time "t1" changes as shown in FIG. 3, the predictive value calculating device 22 predictively calculates, from the flow rate of the heat medium 5 that was measured by the flowmeter 11 at the time "t1", a flow rate at which the heat medium 5 is estimated to flow during a prediction period from the time "t1" to time "t3". To ensure faster calculation by reducing a calculation capacity, the flow rate of the heat medium 5 during the prediction period is linearly calculated (see a solid line in a first row of FIG. 3) under an assumption that the flow rate of the heat medium 5 changes at a rate corresponding to the time "t1". Next, the predictive value calculating device 22 predictively calculates, from the predicted changes in the flow rate of the heat medium 5 during the prediction period, those changes in thermal stress and differential thermal expansion (see solid lines in second and third rows of FIG. 3) that are estimated to occur during the prediction period. The prediction period here is either equal to a response time that is a time period from the time the amount of heat generated by the heat source equipment 1 begins changing, until the thermal stress and the differential thermal expansion have started to develop, or a period that has been set to be longer than the response time. The response time can be a theoretically or empirically obtained value.

After the predictive value calculating device 22 has calculated the predictive values of the thermal stress and the differential thermal expansion, the first control input variable calculating device 23 calculates a minimum deviation between the predicted thermal stress during the prediction period and a limit value of the thermal stress (i.e., a deviation between a peak level of the thermal stress and the limit value of the thermal stress), and a minimum deviation between the predicted differential thermal expansion and a limit value of the differential thermal expansion (i.e., a deviation between a peak level of the differential thermal expansion and the limit value of the differential thermal expansion). Based on these minimum deviations, a calculation is conducted on such a first control input variable (rate of change) that does not cause the thermal stress and the differential thermal expansion to exceed the respective limit values during a control input update interval from the time "t1" to time "t2", where "t1<t2<t3". The first control input variable includes that of the heat medium flow controller 15 and that of the main steam control valve 16 (see a fourth row of FIG. 3).

The predictive value calculating device 22 and the first control input variable calculating device 23 repeatedly calculate the first control input variable until the starting process for the steam turbine power plant has been completed in accordance with the sequence described per FIG. 3. This figure shows an example of repeating the sequence three times from time "t0" (<t1) to "t2".

5. Current Value Calculating Device

Figure 4:
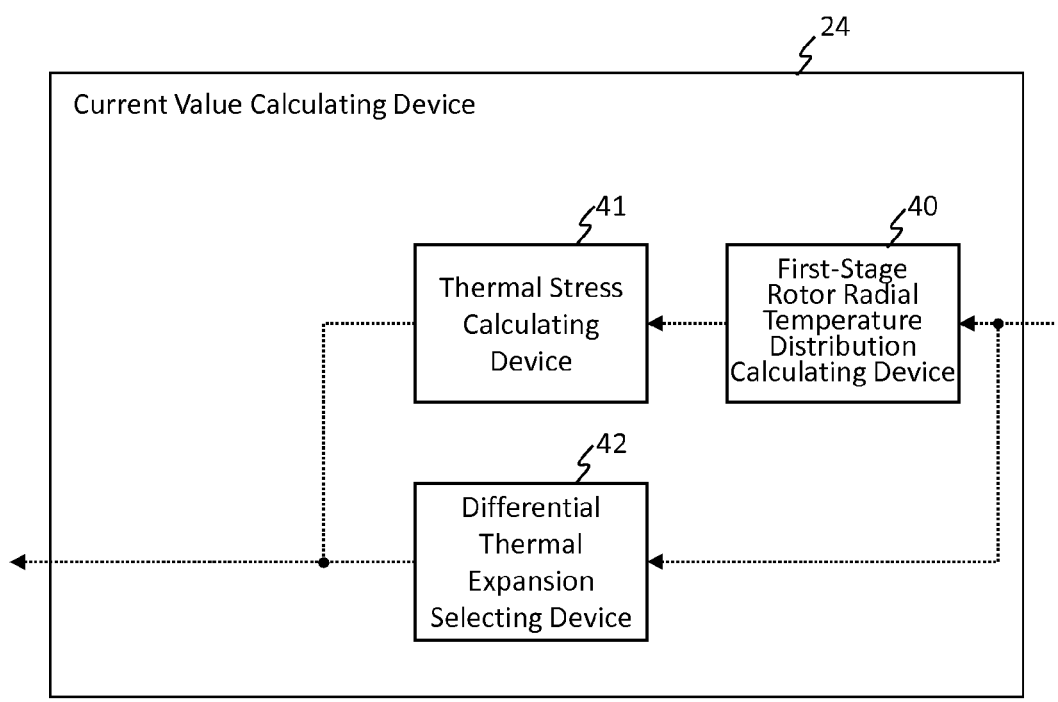
FIG. 4 is a block diagram of a current value calculating device fitted in the steam turbine power plant according to the first embodiment of the present invention.

FIG. 4 is a block diagram that shows details of the current value calculating device 24.

As shown in FIG. 4, the current value calculating device 24 includes a first-stage rotor radial temperature distribution calculating device 40, a thermal stress calculating device 41, and a differential thermal expansion selecting device 42, as elements. These elements are each described in order below.

First-Stage Rotor Radial Temperature Distribution Calculating Device

The first-stage rotor radial temperature distribution calculating device 40 predictively calculates a radial distribution of the turbine rotor temperature by calculating the heat transfer to the turbine rotor predictively from the first-stage metal temperature of the steam turbine 3 that was measured by the temperature gauge 20.

Thermal Stress Calculating Device

The thermal stress calculating device 41 calculates, from calculation results by the first-stage rotor radial temperature distribution predictive calculating device 40, the turbine rotor thermal stress at the current time, based on the materials mechanics calculation using the coefficient of linear thermal expansion, Young's modulus, Poisson's ratio, and other parameters of the turbine rotor.

Differential Thermal Expansion Selecting Device

The differential thermal expansion selecting device 42 selects from the process variables data 17 the differential thermal expansion of the turbine rotor and casing that was measured by the differential thermal expansion gauge 14, and then outputs the selected value.

6. Calculation Sequence Relating to the Second Control Input Variable

Figure 5:
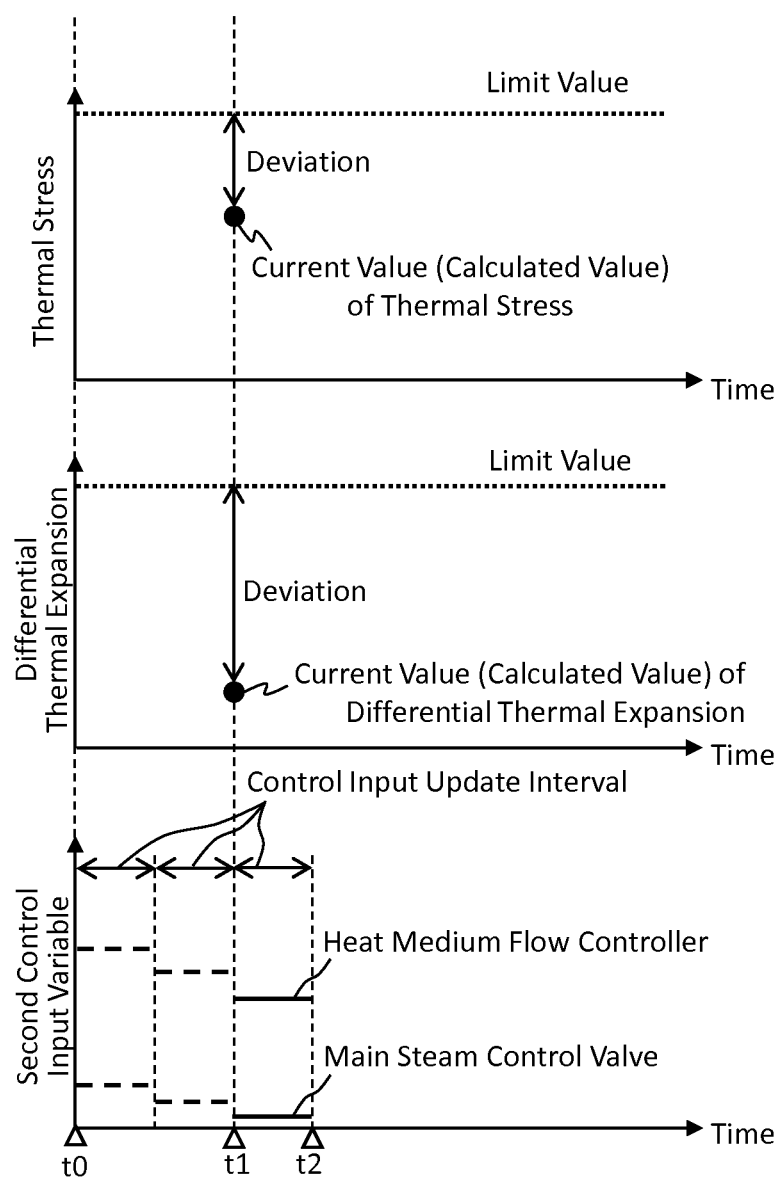
FIG. 5 is an explanatory diagram showing a calculation sequence relating to a second control input variable.

FIG. 5 is an explanatory diagram showing a calculation sequence relating to the second control input variable. The time "t0", "t1", "t2" in the figure is keyed to that of FIG. 3.

The current value calculating device 24 calculates current values of the thermal stress and differential thermal expansion at the time "t1", from the section of the process variables data 17 that corresponds to the metal temperature and differential thermal expansion of the steam turbine first stage at the time "t1" (see first and second rows of FIG. 5).

After that, the second control input variable calculating device 25 calculates, from the current value of the thermal stress at the time "t1" and a deviation of the thermal stress limit value as well as from the current value of the differential thermal expansion at the time "t1" and a deviation of the differential thermal expansion limit value, such a second control input variable (rate of change) that does not cause the thermal stress and the differential thermal expansion to exceed the respective limit values during the control input update interval. The second control input variable includes that of the heat medium flow controller 15 and that of the main steam control valve 16 (see a third row of FIG. 5).

In this manner, whereas the first control input variable calculating device 23 calculates the first control input variable from the predicted values of the thermal stress and differential thermal expansion estimated to occur during the fixed period of time ahead from the current time of day, the second control input variable calculating device 25 calculates the second control input variable from the thermal stress and differential thermal expansion estimated at the current time. The future thermal stress and differential thermal expansion are not allowed for in the calculation process of the second control input variable. Instead, margins on the limit values of the thermal stress and the differential thermal expansion are allowed for in the calculation process, so the second control input variable usually takes a smaller value than the first control input variable.

The current value calculating device 24 and the second control input variable calculating device 25 repeatedly calculate the second control input variable until the starting process for the steam turbine power plant has been completed in accordance with the sequence described per FIG. 5. This figure shows an example of repeating the sequence three times from time "t0" to "t2".

7. Determining Sequence Relating to the Control Input Variables

Figure 6:
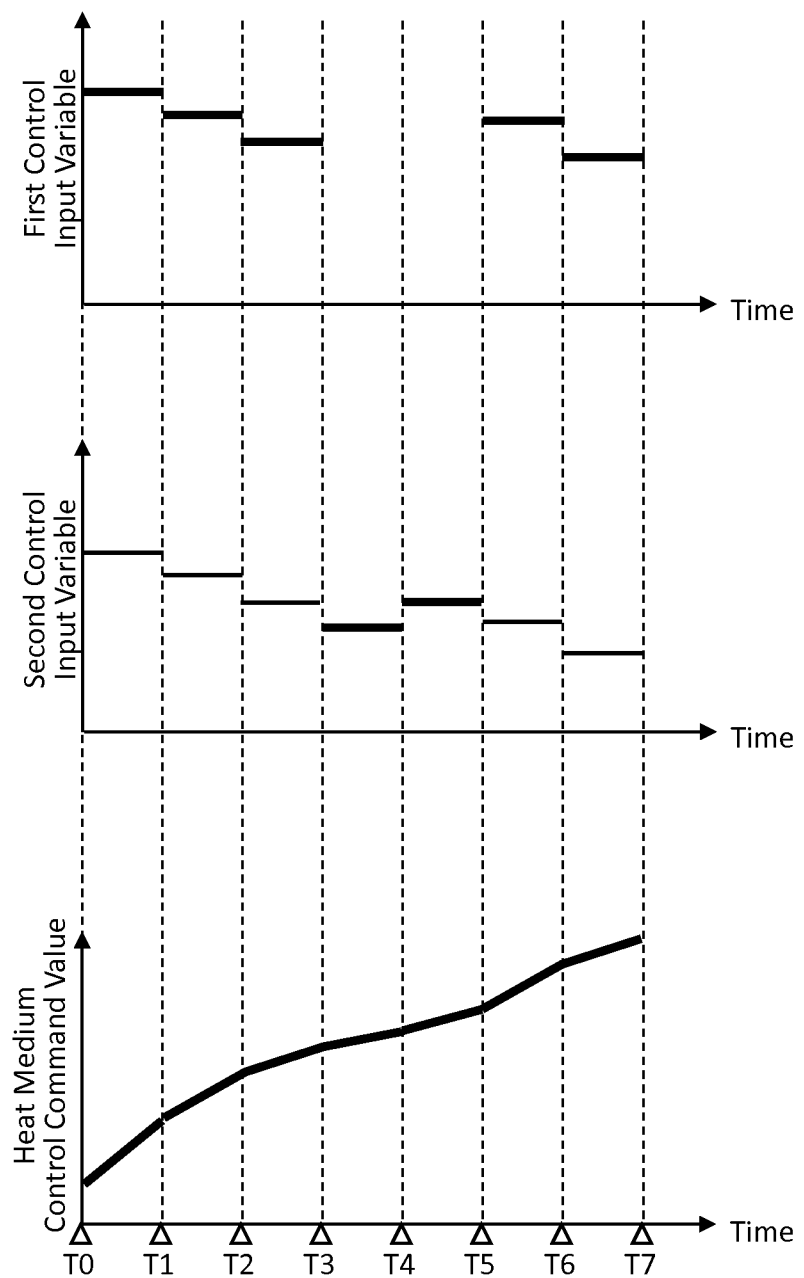
FIG. 6 is a diagram that represents a relationship between control input variables (rates of change) and a command value.

FIG. 6 is a diagram that represents a relationship between the control input variables (rates of change) and a command value (an output value). This figure shows an example of a relationship between the first and second control input variables (in first and second rows of the figure) for the heat medium flow controller 15, and the heat medium flow control command value 18 (in a third row of the figure). However, a relationship between the first and second control input variables for the main steam control valve 16, and the main steam control command value 19, is substantially the same as above, so description of the latter relationship is omitted herein.

Referring to FIG. 6, symbols T1, T2, etc. up to T7 denote equal intervals of time, and the time interval of T1-T2, for example, is equal to the control input update interval shown in FIGS. 3 and 5. As shown in FIG. 6, the first and second control input variables are calculated in parallel. In the shown example, at the time T1-T3 and the time T5-T7, the first control input variable is input from the first control input variable calculating device 23, so the command output device 26 selects the first control input variable (the first row) preferentially over the second control input variable, then integrates the second control input variable, and thus calculates the heat medium flow control command value 18 (the third row).

In contrast to the above, at the time T3-T5, the first control input variable is not input from the first control input variable calculating device 23. In this case, the command output device 26 selects the second control input variable (the second row) as a backup, then integrates the second control input variable, and thus calculates the heat medium flow control command value 18 (the third row). Examples of a reason for which the first control input variable is not input include those that because of a malfunction of a measuring instrument, a part of the process variables of the plant physical quantities may not be obtainable or the predictive calculation may not keep up with the changes in thermal stress or other startup constraints.

8. Effects

As described above, the first control input variable for the heat medium flow controller 15 and the main steam control valve 16 is calculated from the predictive values of the startup constraints, while at the same time the second control input variable is calculated in parallel from the current values (calculated values) of the startup constraints. Usually, the heat medium flow control command value 18 and main steam control command value 19 that are based on the first control input variable are output to the heat medium flow controller 15 and the main steam control valve 16, respectively. However, if the predictive values of the startup constraints cannot be obtained for a reason such as the malfunction of a measuring instrument or delay in the calculation, the heat medium flow control command value 18 and main steam control command value 19 based on the second control input variable are output as a backup to the heat medium flow controller 15 and the main steam control valve 16, respectively. Even if an appropriate predictive value of a startup constraint cannot be obtained, therefore, the present embodiment allows a thermal stress and differential thermal expansion to be prevented from exceeding the respective limit values, and hence the steam turbine power plant to be safely started.

In the present embodiment, since a command value is calculated by the integration of the relevant control input variable (rate of change), when switching between control based on the predictive value of a startup constraint and control based on the current value of the startup constraint takes place, the command value continuously changes to allow smooth control switching as well.

Second Embodiment

Figure 7:
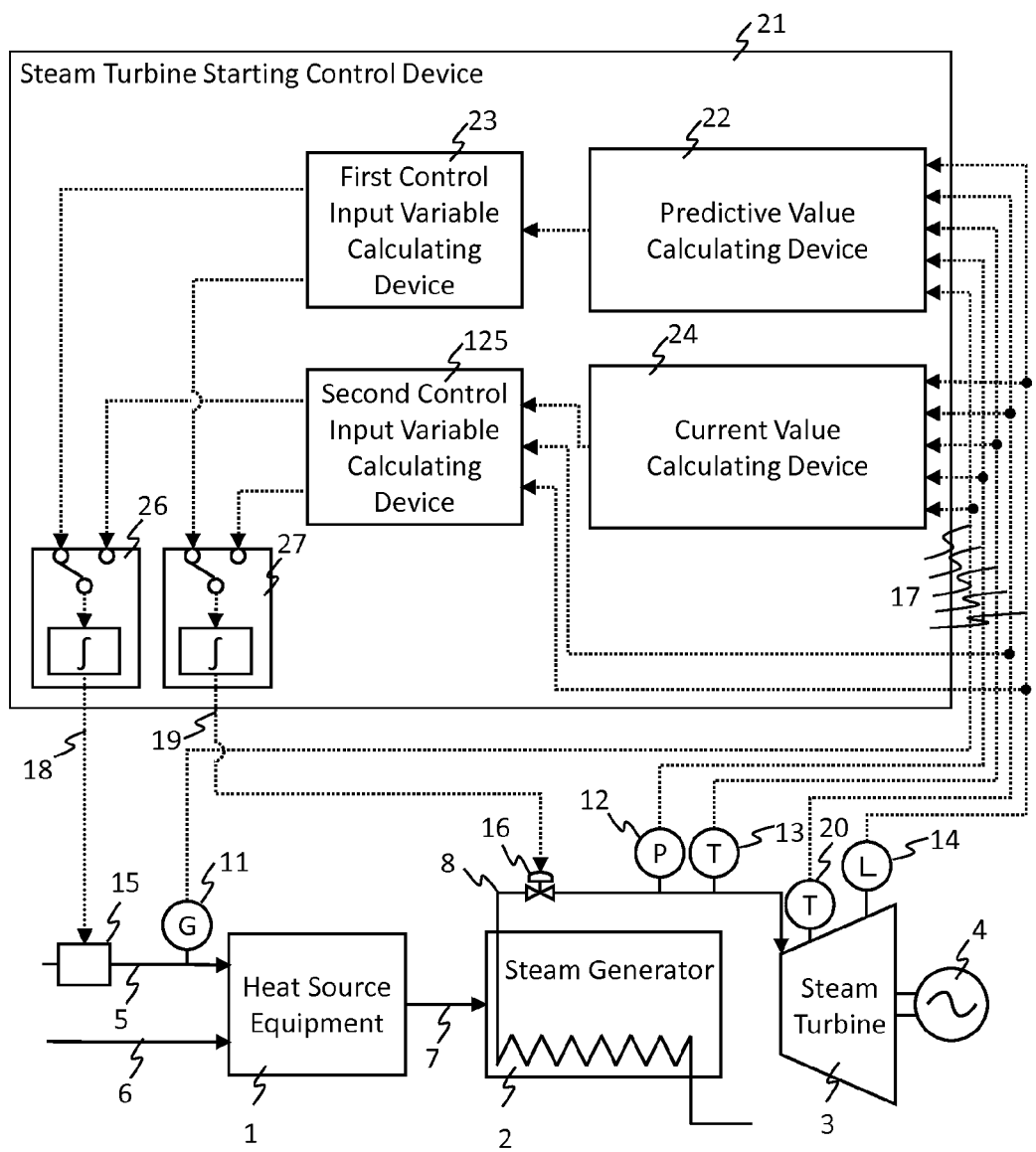
FIG. 7 is a schematic configuration diagram of a steam turbine power plant according to a second embodiment of the present invention.

FIG. 7 is a schematic configuration diagram of a steam turbine power plant according to a second embodiment of the present invention. In the figure, the same elements as in the first embodiment are each assigned the same reference number as used on the drawings, and description of these elements is omitted herein.

The present embodiment differs from the first embodiment in that the value of a second control input variable is retained in a case that a process variable of the plant physical quantities is not input from a measuring instrument. More specifically, the first-stage metal temperature of the steam turbine 3 measured by the temperature gauge 20, and the differential thermal expansion measured by the differential thermal expansion gauge 14, in addition to the current value of a startup constraint that was measured by the current value calculating device 24, are input to a second control input variable calculating device 125 in the present embodiment. The second control input variable calculating device 125 determines whether the values measured by the temperature gauge 20 and the differential thermal expansion gauge 14 are input, and if these values are both input, calculates the second control input variable from the current value of the startup constraint. If one or both of the values measured by the temperature gauge 20 and the differential thermal expansion gauge 14 are not input, however, the second control input variable calculating device 125 assigns zero to the second control input variable and outputs the assigned value to the command output device 26, 27. If zero is assigned to the second control input variable, that is, if the rate of change is 0 (zero), the values during the control input (signal) update interval corresponding to an immediately previous cycle are retained as the heat medium flow control command value 18 and the main steam control command value 19.

Other configurational factors are substantially the same as in the first embodiment.

If, for some abnormality or disturbance, the value measured by the temperature gauge 20 or the differential thermal expansion gauge 14 is not input, this will reduce reliability of the current value calculated by the current value calculating device 24. The current value whose reliability is not ensured will not perform a function as a backup of a predictive value, and if the heat medium flow controller 15 and the main steam control valve 16 are controlled according to the second control input variable, the thermal stress or the differential thermal expansion will exceed the limit value, thus resulting in the plant not being likely to be safely started.

In contrast to this, if in the present embodiment there occurs an unusual event that one or both of the values measured by the temperature gauge 20 and the differential thermal expansion gauge 14 cannot be obtained, since the second control input variable is set to be zero and thus since the control input variable of the heat medium flow controller 15 and the main steam control valve 16 is retained, it can be avoided that the thermal stress or the differential thermal expansion exceeds the limit value. Under a normal state that the values measured by the temperature gauge 20 and the differential thermal expansion gauge 14 are both obtained, substantially the same effects as in the first embodiment can be obtained since the second control input variable is calculated in substantially the same manner as that of the first embodiment.

(Miscellaneous Qualities and Aspects)

While an example of applying the present invention to a combined-cycle power plant has been described in the embodiments, the invention can be applied to substantially all types of power plants including steam turbines, represented by steam power plants and solar thermal power plants. Sequences to be used to start these power plants are substantially the same as in the embodiments.

For example, when the present invention is applied to a steam power plant, coal or natural gas is equivalent to the heat source, air or oxygen to the low-temperature flow, a fuel control valve to the heat medium flow controller 15, a boiler furnace to the heat source equipment 1, a combustion gas to the high-temperature flow, a boiler heat transfer section (steam-generating section) to the steam generator 2, and boiler load controllers to the first and second control input variables setters 23, 25, 125.

For example, when the present invention is applied to a solar thermal power plant, solar light is equivalent to the heat source, a solar heat-collecting panel drive to the heat medium flow controller 15, a solar heat-collecting panel to the heat source equipment 1, an oil, a high-temperature solvent salt, or any other appropriate solar-energy conversion and hold medium to the low-temperature flow and the high-temperature flow, and solar heat collection quantity controllers to the first and second control input variables setters 23, 25, 125.

In addition, the process variables of the flowmeter 11, pressure gauge 12, temperature gauges 13, 20, and differential thermal expansion gauge 14, have been shown by way of example as the process variables data 17 that is input to the predictive value calculating device 22 and the current value calculating device 24. However, the values required for the calculation or the correction of the predictive values and/or current values of the startup constraints are likely to differ according to the method of calculation used, so the kind of process variable to be input to the predictive value calculating device 22 and the current value calculating device 24, and the kind of measuring instrument to which the process variables data 17 is to be output can both be changed as appropriate.

What is claimed is:

1. A steam turbine power plant, comprising:
   heat source equipment that heats a low-temperature flow by applying a heat medium and thus generates a high-temperature flow;
   a steam generator that generates steam using the high-temperature flow generated by the heat source equipment;
   a steam turbine driven by the steam generated by the steam generator;
   an electric generator that converts rotational motive power of the steam turbine into electric power;
   a controller that controls a load of a plant;
   a measuring instrument that measures a physical quantity of the plant;
   a predictive value calculating device that calculates a predictive value of a startup constraint of the steam turbine from a value measured by the measuring instrument;
   a first control input variable calculating device that calculates a first control input variable for the controller based upon the predictive value;
   a current value calculating device that calculates a current value of the startup constraint of the steam turbine based upon the value measured by the measuring instrument;
   a second control input variable calculating device that calculates a second control input variable for the controller based upon the current value; and
   a command output device configured so that while preferentially selecting the first control input variable, if the first control input variable is not calculated, the command output device selects the second control input variable instead, the command output device being further configured to output an appropriate command value to the controller according to the kind of selected control input variable.

2. The steam turbine power plant according to claim 1, wherein:
   the first and second control input variables are each a rate of change; and
   the command value to the controller is a value obtained by integrating the selected control input variable.

3. The steam turbine power plant according to claim 1, wherein the second control input variable calculating device retains a value of the second control input variable if the value measured by the measuring instrument is not input.

4. The steam turbine power plant according to claim 1, wherein:
   the controller includes a heat medium flow controller that controls a flow rate of the heat medium supplied to the heat source equipment, and a main steam control valve that controls a flow rate of the steam supplied to the steam turbine; and
   the measuring instrument includes a flowmeter that measures a flow rate of the heat medium supplied, a temperature gauge that measures a metal temperature of the steam turbine, and a differential thermal expansion gauge that measures differential thermal expansion of the steam turbine.

5. A method for starting a steam turbine power plant including:
   heat source equipment that heats a low-temperature flow by applying a heat medium and thus generates a high-temperature flow;
   a steam generator that generates steam using the high-temperature flow generated by the heat source equipment;
   a steam turbine driven by the steam generated by the steam generator;
   an electric generator that converts rotational motive power of the steam turbine into electric power;
   a controller that controls a load of a plant; and
   a measuring instrument that measures a physical quantity of the plant;
   the method comprising:
   calculating a predictive value and current value of a startup constraint of the steam turbine from a value measured by the measuring instrument;
   calculating in parallel a first control input variable for the controller based upon the predictive value, and a second control input variable for the controller based upon the current value; and
   while preferentially selecting the first control input variable, if the first control input variable is not calculated, selecting the second control input variable instead, and after the selection of at least one of the first and second control input variables, transmitting an appropriate command value to the controller according to the kind of selected control input variable.

6. The method for starting a steam turbine power plant according to claim 5, further comprising:
   retaining a value of the second control input variable if the value measured by the measuring instrument is not input.

* * * * *